United States Patent
Deng et al.

(10) Patent No.: US 9,098,802 B2
(45) Date of Patent: Aug. 4, 2015

(54) INFERRING CONTEXTUAL USER STATUS AND DURATION

(71) Applicants: Peter Xiu Deng, Mountain View, CA (US); Adam Gregory Wolff, San Francisco, CA (US); Koen Bok, San Francisco, CA (US)

(72) Inventors: Peter Xiu Deng, Mountain View, CA (US); Adam Gregory Wolff, San Francisco, CA (US); Koen Bok, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 270 days.

(21) Appl. No.: 13/722,696

(22) Filed: Dec. 20, 2012

(65) Prior Publication Data

US 2014/0180983 A1 Jun. 26, 2014

(51) Int. Cl.
*G06F 15/18* (2006.01)
*G06N 3/02* (2006.01)
*G06Q 50/00* (2012.01)

(52) U.S. Cl.
CPC . *G06N 3/02* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 2004/0234066 A1* | 11/2004 | Beckstrom et al. | 379/266.07 |
| 2007/0299795 A1* | 12/2007 | Macbeth et al. | 706/16 |
| 2008/0005381 A1 | 1/2008 | Theocharous | |
| 2010/0306163 A1* | 12/2010 | Beaty et al. | 706/52 |
| 2010/0332330 A1 | 12/2010 | Goel | |
| 2011/0071869 A1 | 3/2011 | O'Brien | |
| 2012/0150777 A1* | 6/2012 | Setoguchi et al. | 706/14 |
| 2012/0264446 A1 | 10/2012 | Xie | |
| 2012/0271831 A1 | 10/2012 | Narayanan | |

FOREIGN PATENT DOCUMENTS

| | | | |
|---|---|---|---|
| EP | 1256875 A1 | 11/2002 | |
| WO | WO 2012-022021 A1 | 2/2012 | |
| WO | WO 2012-044436 A2 | 4/2012 | |

OTHER PUBLICATIONS

European Patent Office Search Report for Application 13197655.7—1958, Mar. 27, 2014.
International Search Report and Written Opinion for International Application No. PCT/US2013/076552, Apr. 28, 2014.

* cited by examiner

*Primary Examiner* — Li-Wu Chang
(74) *Attorney, Agent, or Firm* — Baker Botts L.L.P.

(57) ABSTRACT

In one embodiment, a method includes one or more server computing devices receiving first data associated with an activity recently performed or currently being performed by a user of one or more client computing devices. A current state of the user is inferred at least in part by analyzing at least the first data, and second data associated with one or more historical durations associated with the inferred current state is accessed. An end time associated with the inferred current state is estimated based at least in part on the second data.

21 Claims, 5 Drawing Sheets

INFERRING CONTEXTUAL USER STATUS AND DURATION

TECHNICAL FIELD

This disclosure generally relates to social-networking systems and the determination of the status of users of the social-networking system.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Particular embodiments enable a computing system to infer the current status of a user based on signals collected by an electronic device of the user and then calculate an estimated duration for the user's inferred status based on historical data associated with the inferred status. In some embodiments, the collected signals may include: the type of electronic device (e.g., web browser, mobile computing device, desktop computing device), the IP address of the electronic device, data collected from third-party services (e.g., Spotify, Netflix), or data collected from an sensors (e.g., Global Positioning System (GPS) sensors, Radio-Frequency Identification (RFID) sensors) attached to the electronic device. In some embodiments, the collected signals may be combined with historical data associated with the user to infer the user's status. In some embodiments, the user status may be that the user is: watching a movie, listening to a radio station, watching a TV show on a streaming service, playing a video game, or exercising.

In particular embodiments, the computing system further calculates the estimated duration for the user's inferred status based on stored historical data associated with the inferred status. In some embodiments, the computing system will access data stored in the social-graph of the social-networking system associated with other user's average durations associated with the same inferred user status. In some embodiments, the computing system will further access data associated with the first user's past durations for the inferred status. The computing system may then calculate an estimated end time for the user's inferred status based on the durations. In some embodiments, the user's current status along with an estimated time of completion may thus be communicated to other user's of the social-networking system.

DESCRIPTION OF EXAMPLE EMBODIMENTS

Figure 1:
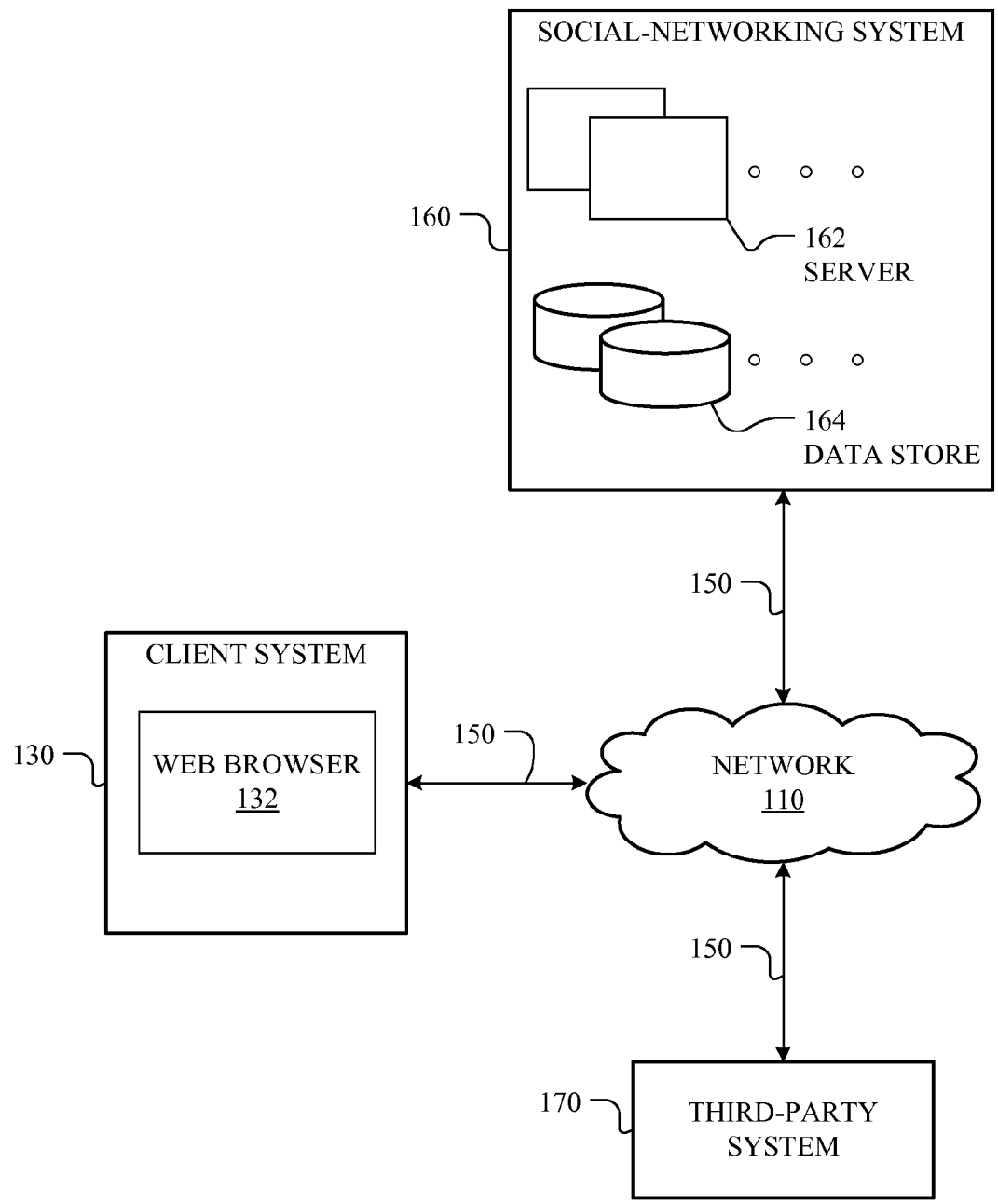
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, third-party system 170 may be a network-addressable computing system that can host exercise routine information (e.g., Nike+), steaming pre-recorded media (e.g., Hulu, Netflix, SPOTIFY), or video game hosting. Third-party system 170 may generate, store, receive, and send status-related data, such as, for example, the duration of a run in progress, the current run-time of a viewed movie, or the name of a game currently being played. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
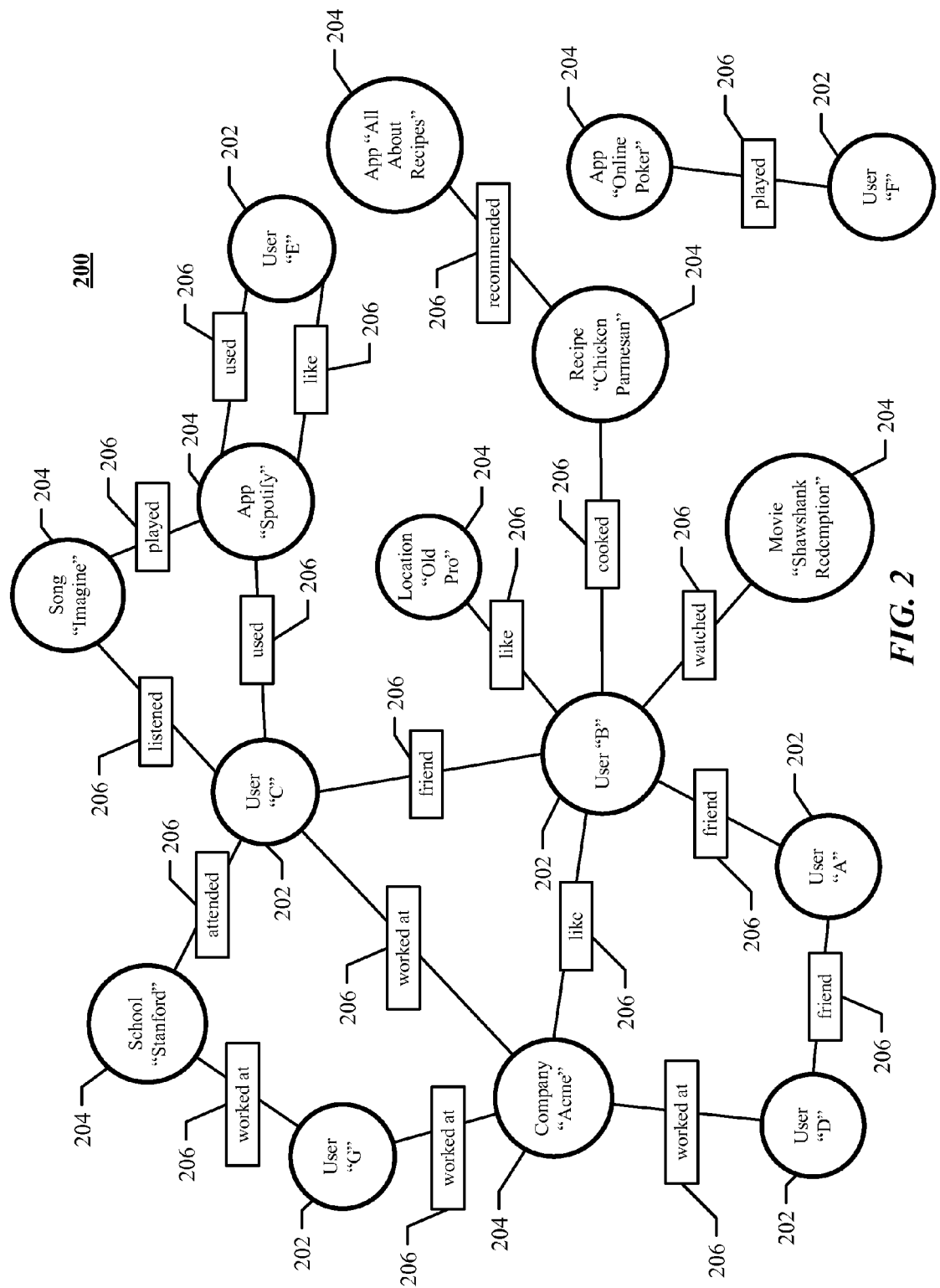
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 3:
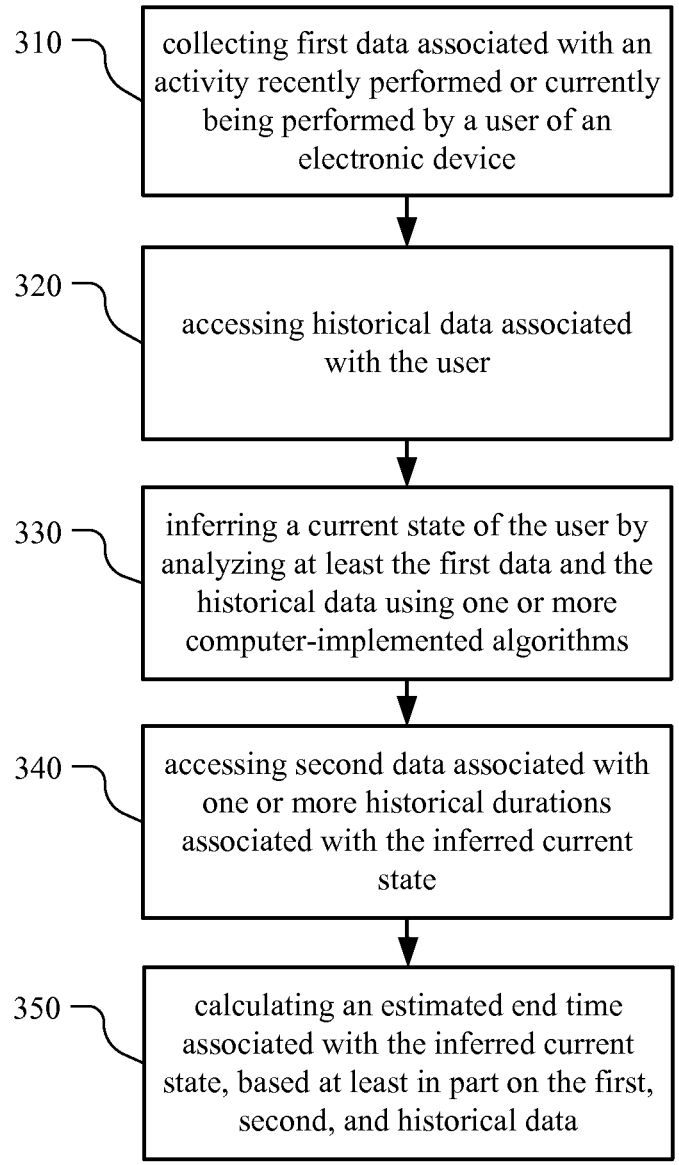
FIG. 3 illustrates an example method for inferring contextual user status and duration.

FIG. 3 illustrates an example method 300 for inferring contextual user status and duration. The method may begin at step 310, where one or more computing devices collect first data associated with a recent activity performed by a user of an electronic device. As used herein, collecting data may include gathering data, receiving data, or both. The first data is associated with a recent activity, and is consequently time limited. The sampling window for which first data is collected may be sized appropriately to the type of user status to be inferred. In particular embodiments, the window for first data collection may be pre-set to a fixed size for all collected data (e.g., only inputs collected in the previous 10 minutes). In other embodiments, the window may be variable depending on the type of data collected. Some data types may be more time-sensitive. For instance, an identifier of the electronic device may be collected any time within the previous 20 minutes; whereas the electronic device location must be collected within the previous 5 minutes. In other embodiments, the window may be variable based on both the data type and previous data collected. As an example, the system may collect data representing the identifier of the electronic device within a 20 minute window. When the device identification data indicates that the electronic device is a desktop computer or television, the electronic device location may be collected within a 24-hour window. However, when the device identification data indicates that the electronic device is a laptop computer or a smartphone, the electronic device location must be collected within a 5-minute window. This permits more efficient collection of data based on categories of inputs known to be more stable.

In particular embodiments, the first data may be collected directly by the electronic device. For example, the first data may be an identifier of the electronic device. In particular embodiments, the identifier may specify the type of electronic device, such as a smartphone, laptop computer, desktop computer, tablet, nettop computer, television, or other device. In other embodiments, the identifier may indicate a specific electronic device as opposed to the broad category, such as a specific television or computer owned by the user. In some embodiments, the identifier may be a specific identifier code or signal stored or provided by the electronic device. In other embodiments, the identifier may be a combination of signals intended for another purpose (e.g., a MAC address) that uniquely identify a device when compared against a database of known signals.

In particular embodiments, the first data may be an Internet Protocol (IP) address or other networking protocol address of the electronic device. The IP address of the electronic device may be used to infer or determine other information regarding the electronic device. In particular embodiments, the IP address may be used to determine the approximate location of the electronic device. In other embodiments, the IP address may be used to determine the specific network the device is located on (e.g., the electronic device is on the user's work network, the electronic device is on the network associated with building one at the Menlo Park campus of the user's work). In other embodiments, the electronic device may be using a static IP address, and the IP address may be used to identify the specific device. In other embodiments, the IP address may be used to identify the type (e.g., GSM, LTE, landline, public hotspot) of network connection. IP address may be assigned to network access providers in logical blocks, allowing the identification of the specific network access provider and network type.

In particular embodiments, the first data may be a location of the electronic device. In some embodiments, the location of the electronic device may be provided via a GPS device integrated into the electronic device, assisted GPS (AGPS), or cellular tower triangulation. In particular embodiments, the location of the electronic device may be computed from an IP address as described above. In some embodiments, the location may be explicitly provided from the user. In particular embodiments, the location may be inferred from the user's actions. For instance, if the user has just "Checked In" at a coffee shop, the user's smartphone can be assumed to be at the same location. In some embodiments, the first data may include a velocity vector in addition to location data. The velocity vector may be used to determine an appropriate window in which to collect location data. For example, an electronic device traveling at a high velocity must utilize a smaller sampling window than an electronic device at rest.

In particular embodiments, the first data may be metadata received from a software application executing on the electronic device. For example, the electronic device may be executing a streaming video application, and that application may provide information identifying the media being watched. In particular embodiments, the first data includes additional application-reported information about the movie, such as the current run-time of the media, the remaining time of the media, or any other suitable information. In particular embodiments, instead of being included with the first data this additional information may by accessed by the computing device receiving the first data, such as for example a server associated with a social-networking system. In some embodiments, the software application may be an exercise application. As an example, the exercise application may provide metadata including: the start-time of the exercise routine; the intended exercise regimen to be performed, and the heart-rate or other biometric measurements of the user. In particular embodiments, the software application may control voice-over-IP (VoIP) or cellular communications. For example, the metadata provided by this application may include the parties communicating, the type of communication (e.g., telephonic, video-conference, SMS, MMS), and the elapsed time of the communication.

In particular embodiments, the first data may be received from the electronic device's sensors, such as a radio-frequency identification (RFID) reader. For example, an RFID I/O device may be included in the user's smartphone. If the user's smartphone passes within close proximity of known RFID tags, the location of the user's smartphone will be known. In particular embodiments, the user may make purchased via an electronic wallet program and an RFID I/O device. For example, if the user purchases lunch at a restaurant via an RFID reader, the location and the contents of the transaction could be collected by the system.

In particular embodiments, at step 320 the system accesses historical data associated with the user. In particular embodiments, the historical data associated with the user may be used to infer the current state of the user or to calculate an estimated end time for the current user state. In some embodiments, the historical data is stored on the electronic device. As an example, the electronic device may log data associated with the software controlling cellular communications for later access. In some embodiments, call logging on the device and an address book stored on the device may be used to determine who is being contacted and to infer the importance of the contact based on the frequency of communication. The log may indicate that when the user initiates a cellular communication with a specific phone number, the communication averages a duration of 35 minutes. In other embodiments, the user may have previously indicated that a specific IP address or an IP address range is her apartment's network. In particular embodiments, the step of accessing historical data associated with the user may not be performed or used to determined a current state of the user, to calculate an estimated end time for the current user state, or both.

In other embodiments, the user is a user of a social-networking system and the historical data associated with the user is stored in social-networking system's 160 social graph 200. For example, the historical data may be associated with one or more user nodes 202, concept nodes 204, or edges 206 of social graph 200. For example, the system may access social graph 200 to determine that the node for User "G" 202 is connected to concept node for Company "Acme" 204 by the "worked at" edge 206. The system can thereby determine based on historical data that User "G" works at "Acme. As another example, social graph 200 may indicate that the user previously liked a specific radio-show host, thereby providing additional relevant input when the metadata associated with an internet radio application running on the electronic device indicates that the user is listening to the corresponding radio station. In some embodiments, social graph 200 may store historical data associated with the user indicating the average durations associated with an activity of the user.

At step 330, the system infers a current state of the user by analyzing at least the first data and the historical data using one or more computer-implemented algorithms. In particular embodiments, the system will analyze all available inputs to construct a richer inferred user status, conveying more useful information. As an example, the minimum information to infer a user state may be that the electronic device is executing the SPOTIFY application. However, as the system is able to analyze more inputs using ore or more computer-implemented algorithms, the inferred state can be more complete. For example, as more inputs are provided, possible inferred user states may be: User is listening to Spotify, User is listening to Imagine on Spotify, User is listening to Imagine on Spotify while jogging, or User is listening to Imagine on Spotify while jogging in Central Park. In particular embodiments, the system may infer a current state of the user by analyzing at least the first data.

In particular embodiments, the system may use regression analysis on some or all of the data collected in step 310 and accessed in step 320 to infer the current user status. In particular embodiments, the system may use a linear regression of multiple independent variables to assign probabilities to a number of possible statuses. An exemplar linear regression may be $y_i = \beta_1 X_{i1} + \beta_2 X_{i2} + \ldots + \beta_p X_{ip}$ wherein $y_i$ represents a possible current user status chosen from a set of possible user statuses, $x_{in}$ represents an independent variable, $\beta_{in}$ represents a weighting factor to be assigned to each variable, and where n spans the values 1 to p. In a particular embodiments, the independent variables may be any of the types of data discussed above in connection with step 310 or 320.

In particular embodiments, the system may use a decision-tree analysis on some or all of the data collected in step 310 and accessed in step 320 to infer the current user status. The system may use data provided by the user to develop decision nodes and chance nodes of the decision tree to infer the current user status. For example, a certain combination of inputs may predict a current user status. In particular embodiments, the system may seek feedback from the user to improve its prediction functions. For example, when the system infers a current user state, it may query the user to verify the accuracy of the inference. In particular embodiments, the system may utilize user verification to develop decision nodes and chance nodes. In particular embodiments, the decision-tree analysis may be desirable in a system with a small number of potential current user statuses. In particular embodiments the decision-tree analysis may be combined with other prediction techniques.

In particular embodiments, the system may use a neural-network analysis on some or all of the data collected in step 310 and accessed in step 320 to infer the current user status. For example, the system may implement a supervised learning neural network to find a function mapping input variables drawn from the data collected in step 310 and accessed in step 320 to known current user statuses. The neural-networking analysis may try to minimize the mean-squared error between the network's inferred current user statuses and known past user statuses. By minimizing this error, the network is able to develop an approximated function for predicting inferred current user statuses.

In particular embodiments, the system may use an expert-system analysis on some or all of the data collected in step 310 and accessed in step 320 to infer the current user status. The system may build a knowledge base of the expert system based on historic data. For example, the system may develop a rule that "IF the electronic device is executing an internet radio application AND the user has liked the radio-show host THEN the user is listening to the entire show of the host". As another example, the system may develop a rule that "IF the current location is a movie theater AND the user has indicated a desire to watch a specific film AND that film is playing at the user's location THEN the user is busy watching the film for the known duration". As another example, the system may develop a rule that "IF the electronic device is on the user's work network AND the electronic device is the user's work laptop AND the electronic device is currently executing a computer programming application THEN the user is busy working". By developing said knowledge base, the system may then run input variables through the expert-system inference engine either in batches or serially to infer the current user status.

This disclosure contemplates any suitable manner of to infer the current user status and utilizing any combination of data collected in step 310 and accessed in step 320 or weighting of factors in the calculation of the predicted future user state.

At step 340, the system accesses second data associated with one or more historical durations associated with the inferred current state. In particular embodiments, the second data provides information on the average amount of time that individuals spend on any given user status. In some embodiments, the system may access average historical durations for users globally, or based on any applicable subset of users. For example, the system may access average historical durations for all individuals in the same geographic area as the user, all individuals in the same age group as the user, and all individuals in the same profession as the user. By drawing on a range of inputs of varying connection to the user, the system is better able to estimate the time spend by the user.

In particular embodiments, social-networking system 160 maintains data on the average duration that users spend on a given user status. In particular embodiments, the system may access historical duration data for all of social graph 200, or an applicable subsection of social graph 200. In particular embodiments, the system may only access historical duration data for nodes connected via edges 206 to the user's node. In some embodiments, the system may only access historical duration data for nodes within a certain degree of separation from the user's node, where each edge represents a single degree of separation. By utilizing historical duration data that is closely related to the user on the social graph, the system may be able to access data that is closely correlated with the user's preferences.

At step 350, the system calculates an estimated end time associated with the inferred current user state, based at least in part on the second data. In particular embodiments, the estimated end time may also be based on the first data and/or the historical data. In some embodiments, the system is able to combine the data accessed in steps 320 and 340 to calculate an estimated duration for the inferred current user status. In some embodiments, the function described in FIG. 4, below, may be used to calculate an estimated duration associated with the inferred current user status. The system may also be able to utilize data collected in step 310 to calculate an elapsed time for the inferred current user status. In particular embodiments, the system may combine all of this data to further calculate an estimated end time for the inferred current user state.

In particular embodiments, the inferred current user status may be used to modify network operations and the estimated end time may be used to terminate the modified network operations. In some embodiments, the user's status on the social-networking system 160 may be automatically updated with the inferred current user status. In this embodiment, providing an estimated end time provides a richer online presence for the user and greater information to the user's contacts. In particular embodiments, the user may use privacy settings to limit social-networking system's 160 sharing of the inferred current user status.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
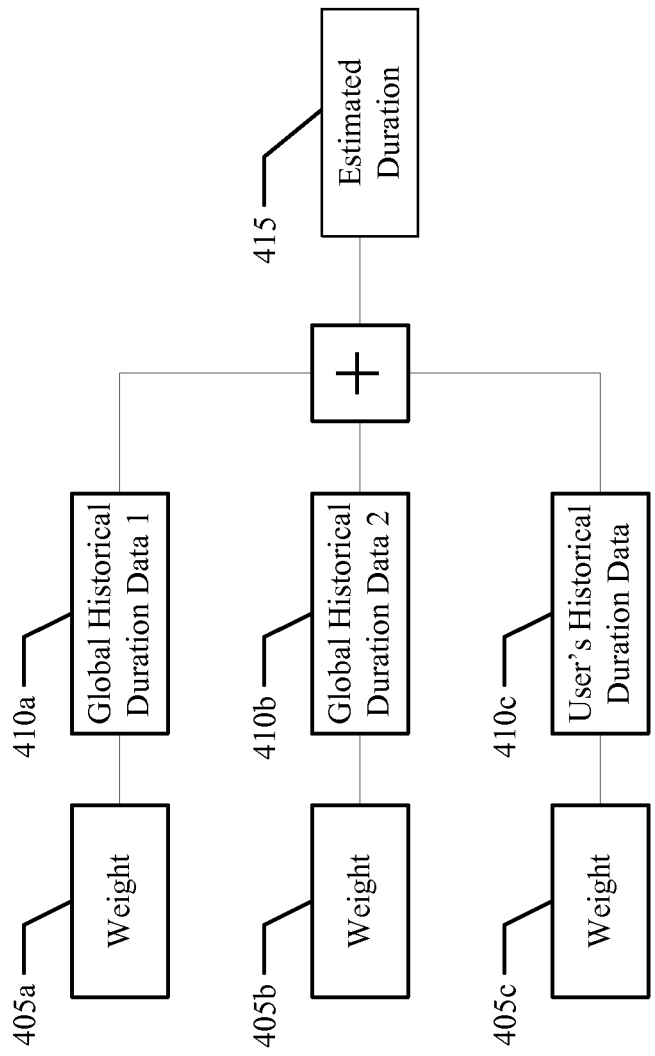
FIG. 4 illustrates an example block diagram of a duration calculation function.

FIG. 4 is a block diagram of an example function for calculating the estimated duration of the inferred current user status. To calculate an estimated duration 415, weights 405 are applied to historical duration data 410 and then combined to obtain an estimated duration 415. Although FIG. 4 shows three groups of historical duration data 410, any number of groups of historical duration data can be employed in other embodiments of the invention. Additionally, in the embodiment of FIG. 4, the groups of historical duration data 410 are combined linearly. In different embodiments, other forms of combination may be used, including harmonic means, mean squares, and geometric means. Additionally, multiple estimated durations with varying weights 405 may be computed before completing the calculation of an estimated end time as described in method step 340.

The system may comprise one or more groups of historical duration data. As discussed above, each group of historical duration data may be any suitable set or sub-set of historical duration data. In some embodiments, the sets or sub-sets of historical duration data may be generated using a machine learned algorithm that is trained using a user's verification data associated with a specific inferred current user status. Machine learning is a scientific discipline that is concerned with the design and development of algorithms that allow computers to learn based on data. The computational analysis of machine learning algorithms and their performance is a branch of theoretical computer science known as computational learning theory. The desired goal is to improve the algorithms through experience (e.g., by applying the data to the algorithms in order to "train" the algorithms). The data are thus often referred to as "training data". Each set or sub-set of historical duration data may produce a given estimated duration where a predictor function may take as an input some or all of the data accessed in method steps 320 and 340 and then outputs a measure of the likelihood that the inferred current user status will have an estimated duration.

In some embodiments, one or more of the sets or sub-sets of historical duration data may use a decay factor in which the strength of the signal from a set's historical activity decays based on the diversity of the set or the dissimilarity to the user. Moreover, different sets of historical duration data may decay at different rates. For example, some sets of historical duration data are loosely correlated with the inferred current user's status. As an example, the global historical duration data for the duration of cellular phone calls may have little correlation with the estimated duration for the user's current status. Various decay mechanisms may be used for this purpose. For example, a predictor function may use a mathematical function, such as an exponential decay, to decay the statistics about an estimated duration.

Figure 5:
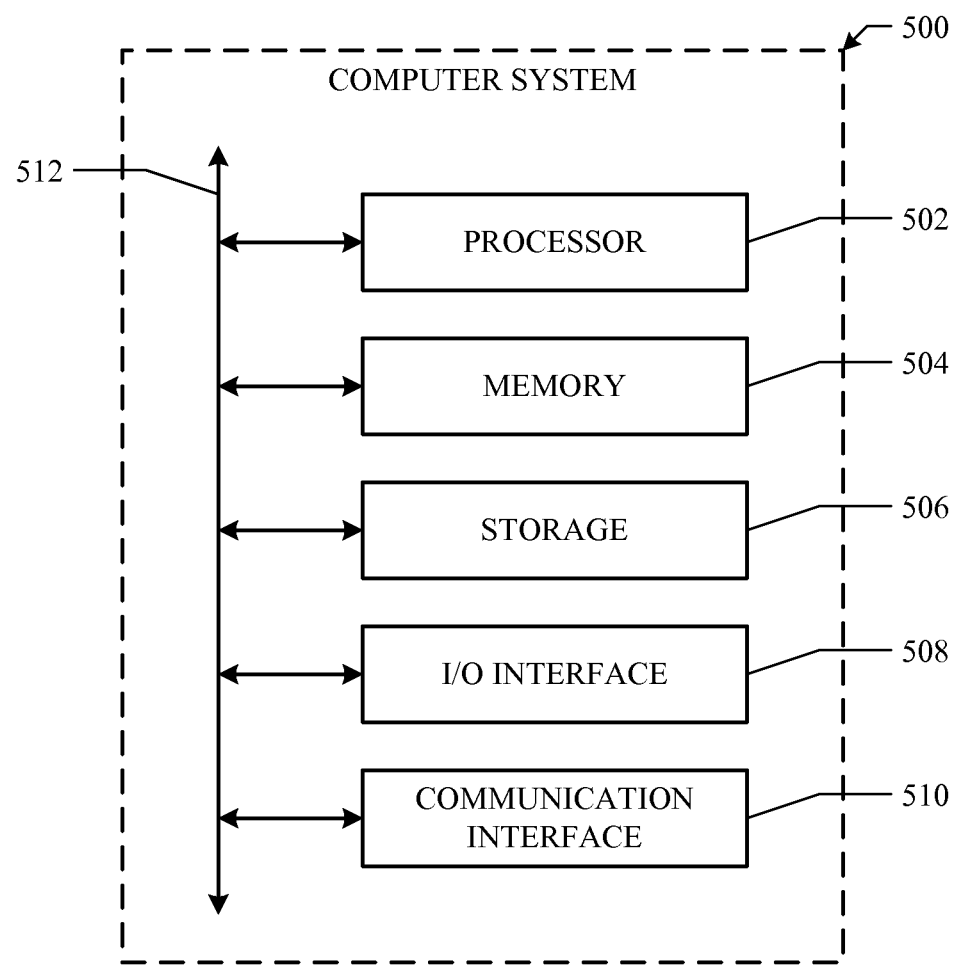
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. In particular embodiments, one or more of these I/O devices may enable communication between an object and computer system 500. As an example and not by way of limitation, an I/O device may include a radio-frequency identification (RFID) receiver and reader. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
by one or more server computing devices, collecting first data associated with an activity recently performed or currently being performed by a user of one or more client computing devices;
by one or more server computing devices, inferring a current state of the user at least in part by analyzing at least the first data;
by one or more server computing devices, accessing second data generated from one or more historical durations associated with the inferred current state, the second data comprising data associated with a social graph of a social networking system, the social graph comprising a plurality of nodes and edges connecting the nodes, at least one node in the graph corresponding to the user; and
by one or more server computing devices, estimating an end time associated with the inferred current state based at least in part on the second data.

2. The method of claim 1, wherein:
the social-networking system further comprises historical data associated with the user; and
the current state of the user is inferred at least in part by analyzing the historical data associated with the user, in addition to the first data.

3. The method of claim 2, wherein:
the historical data comprises information associated with one or more nodes or edges connected to the user's node.

4. The method of claim 1, further comprising, by one or more server computing devices, providing third data based at least in part on the user's inferred current state and associated estimated end time for presentation to one or more other users, each of the other users having at least one node in the graph corresponding to the other user and connected by one or more edges to at least one of nodes corresponding to the user whose current state was inferred.

5. The method of claim 1, wherein the first data comprises one or more of:
an identifier of one of the one or more client computing devices;
an Internet Protocol (IP) address of one of the one or more client computing devices;
a location of one of the one or more client computing devices;
metadata received from a software application executing on one of the one or more client computing devices; or
data received from a radio-frequency identification (RFID) reader attached to one of the one or more client computing devices.

6. The method of claim 1, wherein analyzing comprises analyzing by use of:
regression analysis;
decision-tree analysis;
neural-network analysis; or
expert-system analysis.

7. The method of claim 1, further comprising, by one or more server computing devices, collecting fourth data comprising feedback from the user regarding the accuracy of the inferred current state.

8. One or more computer-readable non-transitory storage media embodying software that is operable when executed to:
collect first data associated with an activity recently performed or currently being performed by a user of one or more client computing devices;
infer a current state of the user at least in part by analyzing at least the first data;
access second data generated from one or more historical durations associated with the inferred current state, the second data comprising data associated with a social graph of a social networking system, the social graph comprising a plurality of nodes and edges connecting the nodes, at least one node in the graph corresponding to the user; and
estimate an end time associated with the inferred current state based at least in part on the second data.

9. The media of claim 8, wherein:
the social-networking system further comprises historical data associated with the user; and
the software that is operable when executed to infer a current state of the user comprises software that is operable when executed to infer the current state of the user at least in part by analyzing the historical data associated with the user, in addition to the first data.

10. The media of claim 9, wherein:
the historical data comprises information associated with one or more nodes or edges connected to the user's node.

11. The media of claim 8, wherein the software is further operable when executed to provide third data based at least in part on the user's inferred current state and associated estimated end time for presentation to one or more other users, each of the other users having at least one node in the graph corresponding to the other user and connected by one or more edges to at least one of nodes corresponding to the user whose current state was inferred.

12. The media of claim 8, wherein the first data comprises one or more of:
an identifier of one of the one or more client computing devices;
an Internet Protocol (IP) address of one of the one or more client computing devices;
a location of one of the one or more client computing devices;
metadata received from a software application executing on one of the one or more client computing devices; or
data received from a radio-frequency identification (RFID) reader attached to one of the one or more client computing devices.

13. The media of claim 8, wherein analyzing comprises analyzing by use of:
   regression analysis;
   decision-tree analysis;
   neural-network analysis; or
   expert-system analysis.

14. The media of claim 8, wherein the software is further operable when executed to collect fourth data comprising feedback from the user regarding the accuracy of the inferred current state.

15. A system comprising:
   one or more processors; and
   a memory coupled to the processors comprising instructions executable by the processors, the processors being operable when executing the instructions to:
      collect first data associated with an activity recently performed or currently being performed by a user of one or more client computing devices;
      infer a current state of the user at least in part by analyzing at least the first data;
      access second data generated from one or more historical durations associated with the inferred current state, the second data comprising data associated with a social graph of a social networking system, the social graph comprising a plurality of nodes and edges connecting the nodes, at least one node in the graph corresponding to the user; and
      estimate an end time associated with the inferred current state based at least in part on the second data.

16. The system of claim 15, wherein:
   the social-networking system further comprises historical data associated with the user; and
   the processors that are operable when executing the instructions to infer a current state of the user comprise processors that are operable when executing the instructions to infer the current state of the user at least in part by analyzing the historical data associated with the user, in addition to the first data.

17. The system of claim 16, wherein:
   the historical data comprises information associated with one or more nodes or edges connected to the user's node.

18. The system of claim 15, wherein the processors are further operable when executing the instructions to provide third data based at least in part on the user's inferred current state and associated estimated end time for presentation to one or more other users, each of the other users having at least one node in the graph corresponding to the other user and connected by one or more edges to at least one of nodes corresponding to the user whose current state was inferred.

19. The system of claim 15, wherein the first data comprises one or more of:
   an identifier of one of the one or more client computing devices;
   an Internet Protocol (IP) address of one of the one or more client computing devices;
   a location of one of the one or more client computing devices;
   metadata received from a software application executing on one of the one or more client computing devices; or
   data received from a radio-frequency identification (RFID) reader attached to one of the one or more client computing devices.

20. The system of claim 15, wherein analyzing comprises analyzing by use of:
   regression analysis;
   decision-tree analysis;
   neural-network analysis; or
   expert-system analysis.

21. The system of claim 15, wherein the processors are further operable when executing the instructions to collect fourth data comprising feedback from the user regarding the accuracy of the inferred current state.

* * * * *